United States Patent

Kienapfel et al.

[11] Patent Number: 5,894,274
[45] Date of Patent: Apr. 13, 1999

[54] MONITORING DEVICE HAVING MONITORING SWITCHES

[75] Inventors: Udo Kienapfel, Dusseldorf; Stawros Orkopoulos; Herbert Recke, both of Wuppertal, all of Germany

[73] Assignee: K. A. Schmersal GmbH & Co., KG, Wuppertal, Germany

[21] Appl. No.: 09/010,086

[22] Filed: Jan. 21, 1998

[30] Foreign Application Priority Data

Jan. 22, 1997 [DE] Germany ............... 197 02 009

[51] Int. Cl.[6] .................................. G08B 21/00
[52] U.S. Cl. ............................ 340/635; 340/644
[58] Field of Search .................... 340/635, 644, 340/652, 653, 660, 661, 664, 650

[56] References Cited

U.S. PATENT DOCUMENTS 4,862,091  8/1989  Hillebrand ................ 324/415
4,977,478  12/1990  Powell ..................... 361/160

FOREIGN PATENT DOCUMENTS 32 41 492  4/1986  Germany.

Primary Examiner—Jeffery A. Hofsass
Assistant Examiner—Julie Lieu
Attorney, Agent, or Firm—Alix, Yale & Ristas, LLP

[57] ABSTRACT

The state of operability of a circuit having at least one group of condition responsive monitoring switches, the switches having first terminals connected to an input signal source and output terminals connected to an evaluation unit, is monitored by periodically interrupting the connection between at least one of the condition responsive switches of each group and the evaluation unit. The evaluation unit compares the change in potential at the output terminal of the one switch, resulting from the interruption, with the potential at the output terminal of another switch.

10 Claims, 1 Drawing Sheet

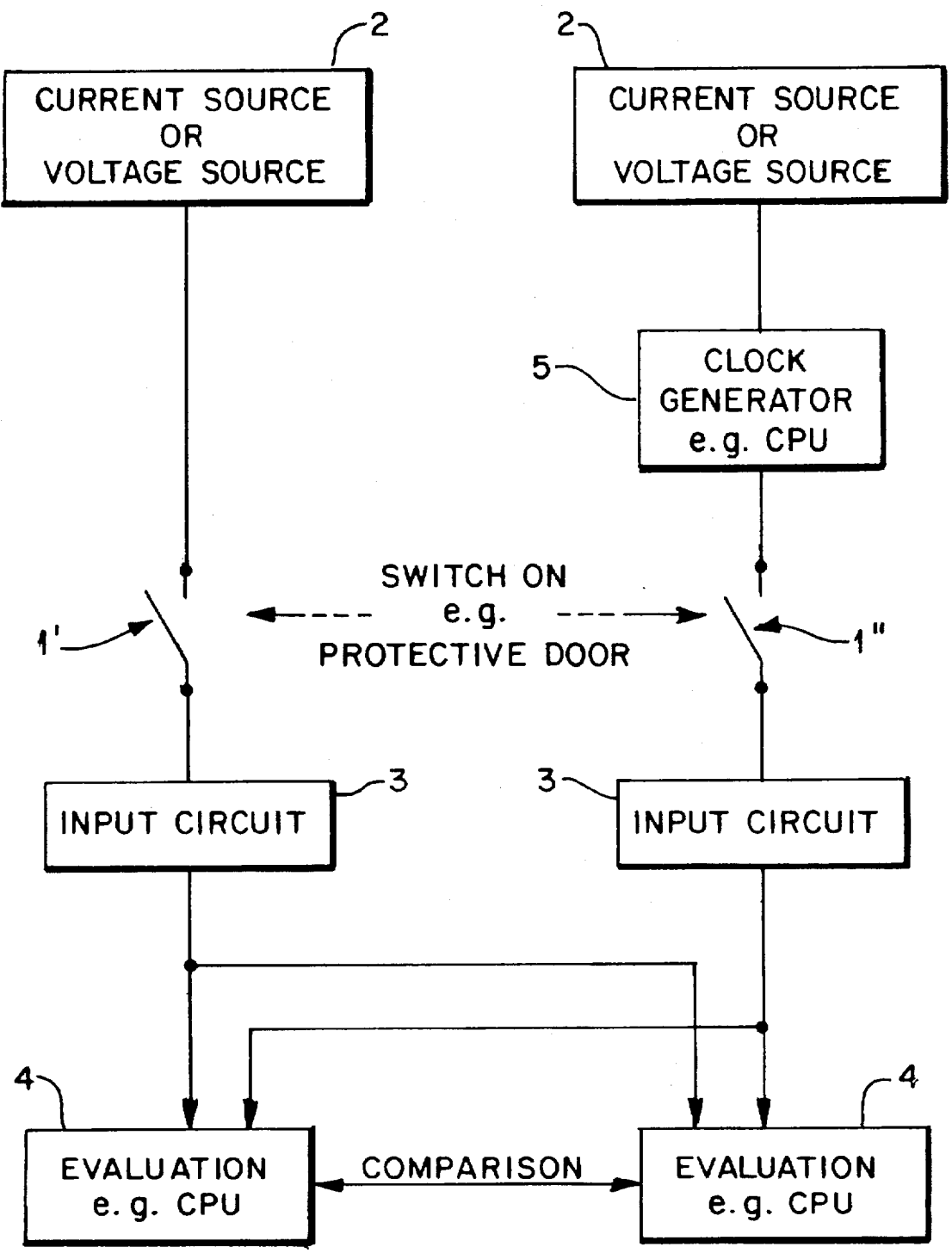

1

MONITORING DEVICE HAVING MONITORING SWITCHES

BACKGROUND OF THE INVENTION

(1) Field of the Invention

The present invention relates to protective systems and, particularly, to monitoring the state of operability of a circuit including plural switches which change state in response to the movement of a guard member such as a security door. More specifically, this invention is directed to methods of and apparatus for periodically evaluating the state of operability of a circuit which includes plural, parallel-connected interlock switches. Accordingly, the general objects of the present invention are to provide novel and improved apparatus and methods of such character.

(2) Description of the Prior Art

While not limited thereto in its utility, the present invention is particularly well suited for employment in monitoring devices which, via a plurality of condition responsive electrical switches, monitor the state, i.e., the open or closed position, of protective coverings such as doors, covers, etc. of machinery or the like. In this demanding operating environment, it is common for plural switches, operatively associated with the secured door, to be hard wired to a remotely located control or alarm. It is possible for the electrical conductors which extend between the switches and the remote control to become damaged over an extended use period of the associated machine. Such damage, i.e., a fault, may take the form of a hard to detect "cross", i.e., a short circuit may develop between a pair of the conductors which are respectively associated with different of the plural interlock switches.

A short circuit of the type discussed above can be laboriously detected by the application of a positive voltage to one of a pair of parallel connected monitoring switches while simultaneously causing the other switch to "switch" zero potential. Observation of the voltage received at the remote control/alarm station during such switching will indicate whether there is a short circuit in the system.

The above-described manual testing technique is, of course, applicable when both of a pair of parallel operated switches operate in the same sense, i.e., are simultaneously either normally closed or normally open. The technique is, however, also applicable in the situation where one of the switches is normally open and the other is normally closed. Under such circumstances, should a short circuit occur, the potentials at monitored terminals located at the control station terminals, which terminals correspond to the output terminals of both switches, will assume the same potential thus indicating the presence of a fault.

The state-of-the-art is also exemplified by the teachings of German Patent 32 41 492. In accordance with this prior art, the switches of the protective circuit to be monitored are connected between a voltage source and a signal processor and the states of the switches are cyclically interrogated through the generation of interrogation pulses which are respectively fed to the processor via a coding line. The processor detects the combination of the pulses on the coding line and thus obtains information as to which switch group as just been interrogated. Although the interrogation of the switching states can be performed in a very short time period, simultaneous monitoring of the switches for their proper functioning is not possible in accordance with the teachings of German Patent 32 41 492.

SUMMARY OF THE INVENTION

The present invention overcomes the above-briefly discussed and other deficiencies and disadvantages of the prior art and, in so doing, permits the checking of the state of operability of a monitoring circuit which includes plural condition responsive signal generators, i.e., closure member operated switches. Thus, in accordance with the invention, apparatus is provided for monitoring the operability of a protective circuit, the protective circuit including at least two condition responsive electrical switches having input and output terminals. The input terminals of the switches are coupled to the same input signal source or to separate sources. The monitoring apparatus includes a "clock generator" connected between the input terminal of a first of the condition responsive switches and the signal source which is coupled thereto. The clock generator includes or comprises a further switch for periodically interrupting the connection between the first condition responses switch input terminal and the input signal source. The monitoring apparatus of the invention further includes a signal evaluator which is coupled to the output terminals of all of the condition responsive switches and to the clock generator. The evaluator, which may comprise a digital data processor, is responsive to the signals appearing on the electrical conductors which, under normal operating conditions, extend uninterrupted and without any short circuits between the evaluator and the output terminals of the condition responsive switches. The signal evaluator is also responsive to signals commensurate with the state of the clock generator switch. In operation, the evaluator, in response to changes in the signal appearing on the conductor which connects to the output terminal of the first switch resulting from operation of the clock generator, also in response to the potential on the conductor which connects the evaluator to the output terminal of the other switch and further in response to signals commensurate with the clock generator switch state, performs a comparison. The results of that comparison are indicative of the presence of absence of a short circuit in the system.

BRIEF DESCRIPTION OF THE DRAWING

The present invention may be better understood, and its numerous objects and advantages will become apparent to those skilled in the art, by reference to the accompanying drawing which is a functional block diagram of a protective circuit which incorporates the invention.

DESCRIPTION OF THE ENCLOSED EMBODIMENT

With reference now to the drawing, the invention is depicted in the environment of a circuit for monitoring the condition, i.e., open or closed, of a protective door which may, for example, be provided to prevent a machine operator from coming into contact with moving components of a machine tool or the like. In the disclosed embodiment, a pair of condition responsive, i.e., monitoring, switches 1' and 1" are operatively connected to the protective door in such a manner that the switches will change state when the door is moved from the closed to the open condition. For purposes of discussion, it will be presumed that switches 1' and 1" are normally closed, i.e., the switches will be closed when the associated door is closed, and will be moved to the open state in which they are depicted in the drawing when the door is moved to the open condition. As will be appreciated by those skilled in the art, alternatively the switches 1' and 1" may be normally open, one switch may be normally open while the other is normally closed and the invention is not limited to an arrangement which utilizes only two switches.

The switches 1' and 1" of the disclosed embodiment are connected in parallel between an input signal source 2, i.e., an electrical power supply, and an evaluator 4. In actual practice, each of switches 1' and 1" may be connected to a separate source of electrical energy 2, as shown, or the switches can be connected to a common source 2. The input signal source(s) 2 may advantageously be a DC voltage source or a constant current DC source which is connected, via electrical conductors which may extend from a control station, to the input terminals of the switches 1' and 1".

While the drawing functionally depicts the use of a pair of evaluators 4, in actual practice the evaluator can conveniently be in the form of a single microprocessor. Prior to inputting to the evaluator 4, the signals appearing on the output terminals of switches 1' and 1" will be conditioned by input circuits 3. Input circuits 3 will typically be located at the control station in close proximity to the evaluator 4. The input circuits 3 will convert the switch output signals, received via electrical conductors which extend from the switch output terminals, into proper form for processing by evaluator 4. For example, the input circuits 3 may be analog to digital converters.

The supply voltage, i.e., the input signal, to one of the condition responsive switches, switch 1" in the embodiment being described, is "clocked", i.e., periodically switched on and off, by means of a clock generator 5. Clock generator 5 may, for example, comprise a solid state switch having "contacts" connected in series between signal source 2 and the input terminal of switch 1". Clock generator 5 may also include a timer which produces actuation pulses for controlling the solid state switch. In the disclosed embodiment, however, these actuation pulses are generated by the evaluator 4. In either case, clock generator 5 periodically interrupts the connection between source 2 and switch 1".

In the embodiment being described, where switches 1' and 1" are normally closed and the associated door is closed, the presence of a signal commensurate with the voltage of source 2 at that evaluation circuit input which corresponds to the output terminal of switch 1' and the absence of a voltage at the input terminal of the evaluator which corresponds to the output terminal of switch 1" when the connection between switch 1" and source 2 is interrupted by clock generator 5 is indicative of a protective circuit which is operable, i.e., there is no short circuit fault.

If a fault is present, under the conditions described immediately above, an input signal will be present on the input to the evaluator 4 which corresponds to the output terminal of switch 1", i.e., both evaluator inputs will be other than zero volts. Restated, if there is a short circuit between the conductors which extend between the output terminals of switches 1' and 1", such a short circuit will be manifested by the appearance of a signal, i.e., a voltage level, at the evaluation circuit input corresponding to switch 1" during time periods when the connection between switch 1" and the source 2 is interrupted by clock generator 5.

It will be understood by those skilled in the art that, rather than "clocking" one of the monitoring switches, it is possible to clock both of the monitoring switches. In such an embodiment, it is necessary for the interruption of the connection between the monitoring switches and the source 2 to be offset in time so that a signal will be applied to the input terminal of one of the switches while the other switch is isolated from the source.

The above-described circuit arrangement and operation will be same when the monitoring switches are normally open devices.

If the protective circuit being monitored includes n switches which either open or close upon actuation, where n>3, the monitoring of the clocked switches can be accomplished using time-division and/or frequency-division multiplexing. Such multiplexing is, of course, appropriate when at least two of the condition responsive switches are "clocked". If the condition-responsive switches which open or close upon actuation are associated with a further switch which operates in the inverse manner, the state of operability of the system can nevertheless be checked employing the present invention. Restated, a fault in the connection to the further switch may be detected regardless of the nature of the fault.

The clocking of the supply voltage to the input terminal of the disclosed embodiment may, for example, result in the input terminal of switch 1" being connected to source 2 for 100 ms and this connection then being interrupted for 1 ms. However, the "clocking" can also be performed in any other desired manner.

If more than one group of condition responsive switches are present and the operability of the circuit in which they are included is to be monitored, it is expedient to employ time-division and/or frequency-division multiplex operation. In such case, at least one monitoring switch of each group will be "clocked", it being possible for a dedicated microprocessor to be used as the evaluator for each group or for a single microprocessor to evaluate all groups.

While a preferred embodiment has been shown and described, various modifications and substitutions may be made thereto without departing from the spirit and scope of the invention. Accordingly, it is to be understood that the present invention has been described by way of illustration and not limitation.

What is claimed is:

1. Apparatus for monitoring the operability of a protective circuit, the protective circuit including at least two condition responsive electrical switches having input and output terminals, the input terminals of the switches being coupled to an electric supply source, said apparatus comprising:

a clock generator connected between the input terminal of one of the condition responsive switches and the electric supply source which is coupled thereto, said clock generator including a switch for periodically interrupting the electrical circuit between the electric supply source and the input terminal of said one switch; and evaluator means normally electrically connected directly to the output terminals of the condition responsive switches and to said clock generator for evaluating the operability of the protective circuit, said evaluator means being responsive to the voltages appearing on the output terminals of the condition responsive switches and to the state of said clock generator switch whereby a signal commensurate with the change in potential at the output terminal of said one condition responsive switch in response to the operation of said clock generator switch is compared to a signal commensurate with the potential at the output terminal of the other condition responsive switch.

2. The apparatus of claim 1 wherein said evaluator means determines the presence of a voltage at the output terminal of said other condition responsive switch and the absence of a voltage level at the output terminal of said one condition responsive switch during the times in which said clock generator interrupts the connection between said one switch and the electric supply source thereto.

3. The apparatus of claim 1 wherein said evaluator means comprises a microprocessor.

4. The apparatus of claim 2 wherein said evaluator means comprises a microprocessor.

5. The apparatus of claim 3 wherein said microprocessor provides command signals for causing operation of said clock generator switch.

6. The apparatus of claim 4 wherein said microprocessor provides command signals for causing operation of said clock generator switch.

7. The apparatus of claim 1 further comprising means for time-dividing and/or frequency-dividing the input signals delivered to said evaluator means.

8. The apparatus of claim 3 wherein said evaluator means further comprises means for conditioning the voltages delivered to said microprocessor.

9. The apparatus of claim 8 wherein said signal conditioning means comprise analog to digital converters.

10. The apparatus of claim 9 wherein said microprocessor provides command signals for causing operation of said clock generator switch.

* * * * *

UNITED STATES PATENT AND TRADEMARK OFFICE
CERTIFICATE OF CORRECTION

PATENT NO.    : 5,894,274
DATED         : April 13, 1999
INVENTOR(S)   : Kienapfel et al.

It is certified that error appears in the above-identified patent and that said Letters Patent is hereby corrected as shown below:

Column 5,
Line 7, after "source" insert -- coupled --.

Signed and Sealed this

Ninth Day of July, 2002

Attest:

Attesting Officer

JAMES E. ROGAN
Director of the United States Patent and Trademark Office